March 28, 1967 S. G. WAABEN 3,311,890

APPARATUS FOR TESTING A STORAGE SYSTEM

Filed Aug. 20, 1963 3 Sheets-Sheet 1

INVENTOR
S. G. WAABEN
BY Lucian C. Canepa
ATTORNEY

March 28, 1967 S. G. WAABEN 3,311,890

APPARATUS FOR TESTING A STORAGE SYSTEM

Filed Aug. 20, 1963 3 Sheets-Sheet 2

United States Patent Office 3,311,890
Patented Mar. 28, 1967

3,311,890

APPARATUS FOR TESTING A STORAGE SYSTEM

Sigurd G. Waaben, Princeton, N.J., assignor to Bell Telephone Laboratories, Incorporated, New York, N.Y., a corporation of New York Filed Aug. 20, 1963, Ser. No. 303,300
17 Claims. (Cl. 340—172.5)

This invention relates to the processing of digital information signals and more particularly to an apparatus for evaluating digital storage systems.

A typical information storage system includes a plurality of individual memory elements interconnected in an organized array to which digital input words are applied for storage and subsequent read out. Thorough testing of each individual element of the array before it is incorporated in the system gives important information to the designer regarding the characteristics of the system. However, such testing does not ordinarily give any indication of the nature of the interaction effects which exist, during operation of the system, among the elements defining a word and among the elements of different words. Unless these effects are understood and taken into account during the design of the storage system, the over-all operating characteristics thereof may be deleteriously affected thereby. Any completely meaningful evaluation of a digital storage system must be directed to testing the over-all organization of the array rather than only the component elements thereof.

Evaluation of the over-all operating characteristics of a storage system involves supplying test information words to the system and then determining the correctness of these words as they are read out of the system. In any relatively large capacity storage system, it is, of course, impracticable to test every word address location with every word that might conceivably be written into and read out of that location. Similarly, it would be virtually impossible to test or exercise a relatively large system by addressing the various word locations thereof with all possible address sequences. Nevertheless, an apparatus designed to evaluate a storage system should have the capability to exercise the system in a manner that closely simulates actual operation. Only in this way can an effective and reliable evaluation of the system be obtained.

An object of the present invention is an improved apparatus for evaluating a digital storage system.

Another object of this invention is an improved apparatus for generating test information signals which are to be presented to a storage system.

Still another object of the present invention is to provide a high degree of freedom in the selection of the storage locations into which test signals are written.

Yet another object of this invention is to provide an indication of the correctness of signals read out of a store which is being evaluated.

A still further object of the present invention is an improved store exerciser which is capable of either systematic or statistically random operation.

These and other objects of the present invention are realized in a specific illustrative embodiment thereof that includes a word-organized memory which serves as a source of reference words. A first stepping switch controls the sequential application of words from the reference memory to a storage system to be tested. A second stepping switch, which normally operates in synchronism with the first switch, controls the sequential application of words from the reference memory to a comparator circuit in which the output of a particular address location in the storage system is checked for correctness by being compared with the reference word which was originally written into that particular location. If the read-out word and the reference word are not identical, the apparatus provides a suitable indication of the fact that an error has been detected.

An address counter in the illustrative apparatus determines the initial and subsequent addresses in the store into which the reference words are respectively written, and an address sequence counter determines the length of each address sequence. In a first or normal mode of operation, the length $a \cdot N$ (where $a$ and N are positive integers) of the address sequence is an exact multiple of the number N of words contained in the reference memory. In this mode the first and second stepping switches operate in synchronism and each switch automatically recycles to a common starting position after each N steps, while the address counter is driven back to its initial representation after each $a \cdot N$ counts by an output signal derived from the address sequence counter.

Briefly, the operation of the illustrative apparatus in this first mode is as follows: initially, the error-detecting circuitry of the apparatus is disabled and reference words are repetitively loaded in sequence into storage addresses determined by the address counter. For example, if the reference memory contains eight words and the address sequence is sixteen, the eight words are respectively applied to the first eight addresses indicated by the address counter and, then, as the stepping switches automatically recycle to their initial starting positions, the same eight words are respectively applied in sequence to the second eight of the sixteen addresses. At this point the stepping switches again recycle to their respective starting positions, the error-detecting circuitry is activated, and the address counter is reset to its initial indication. Then the first word written into the store under test is read out of the store from a location corresponding to the initial indication of the address counter. This read-out word is compared with the reference word associated with the starting position of the second stepping switch, which reference word was initially written into the store under test at the location determined by the initial indication of the address counter. Subsequent to the comparison operation, the reference word associated with the starting position of the first stepping switch is, illustratively, again written into the store at the location determined by the initial indication of the address counter. Then the stepping switches are each advanced by one position and another read-out, write-in cycle takes place. This sequential process continues in the indicated manner in a repetitive fashion, thereby performing a dynamic evaluation of the storage capabilities of the system under test.

In a second mode of operation characteristics of the specific illustrative apparatus considered herein, the length of the address sequence is selected not to be an exact multiple of the number of words contained in the reference memory. In this mode (known as the precessing mode) the first and second stepping switches operate in synchronism and in phase only during the time in which the store under test is being initially loaded with words. Thereafter, the first stepping switch automatically recycles to its starting position after each full stepping sequence, as in the first mode of operation, but the second stepping switch is prematurely reset to its initial position by the signal (derived from the address sequence counter) which sets the address counter to its initial indication. In this way the second switch is advanced in a step-by-step manner in synchronism with the advance of the address counter, to cause the words that were initially written into the selected addresses in the store under test to be applied to the comparator circuit. During this same time the words which were written into the store are read out therefrom in respective synchronism with the advance of the second stepping switch. These words are also applied to the comparator circuit where their correspondence with the reference words is checked.

In one time period of the aforedescribed precessing mode of operation, a first reference word is read out of the reference memory under contol of the second stepping switch. At the same time, there is read out of a first address location of the store under test, a word which corresponds to the first reference word. Subsequently, under control of the first stepping switch, another different reference word is written into the same address location of the store. Hence, in the precessing mode of operation the information content of each address location in the store is regularly varied.

Thus, an illustrative apparatus made in accordance with the principles of the present invention is characterized by effective error-detecting capabilities both in its normal and in its precessing modes of operation.

It is a feature of the present invention that an apparatus for evaluating a digital storage system include a reference memory that is read out by two stepping switches, one of which selects the reference word to be written into the system and the other of which selects the reference word that is to be compared with a word read out of the memory.

It is another feature of this invention that an apparatus for evaluating a digital storage system include a word-organized memory for storing reference words, an address counter for respectively determining the locations in the system to which the reference words are to be applied, and an address sequence counter for determining the length of each address sequence, where the length of each address sequence need not be an exact multiple of the number of reference words stored in the memory.

A complete understanding of the present invention and of the above and other features and advantages thereof may be gained from a consideration of the following detailed description of an illustrative embodiment thereof presented hereinbelow in connection with the accompanying drawing, in which.

Figure 1:
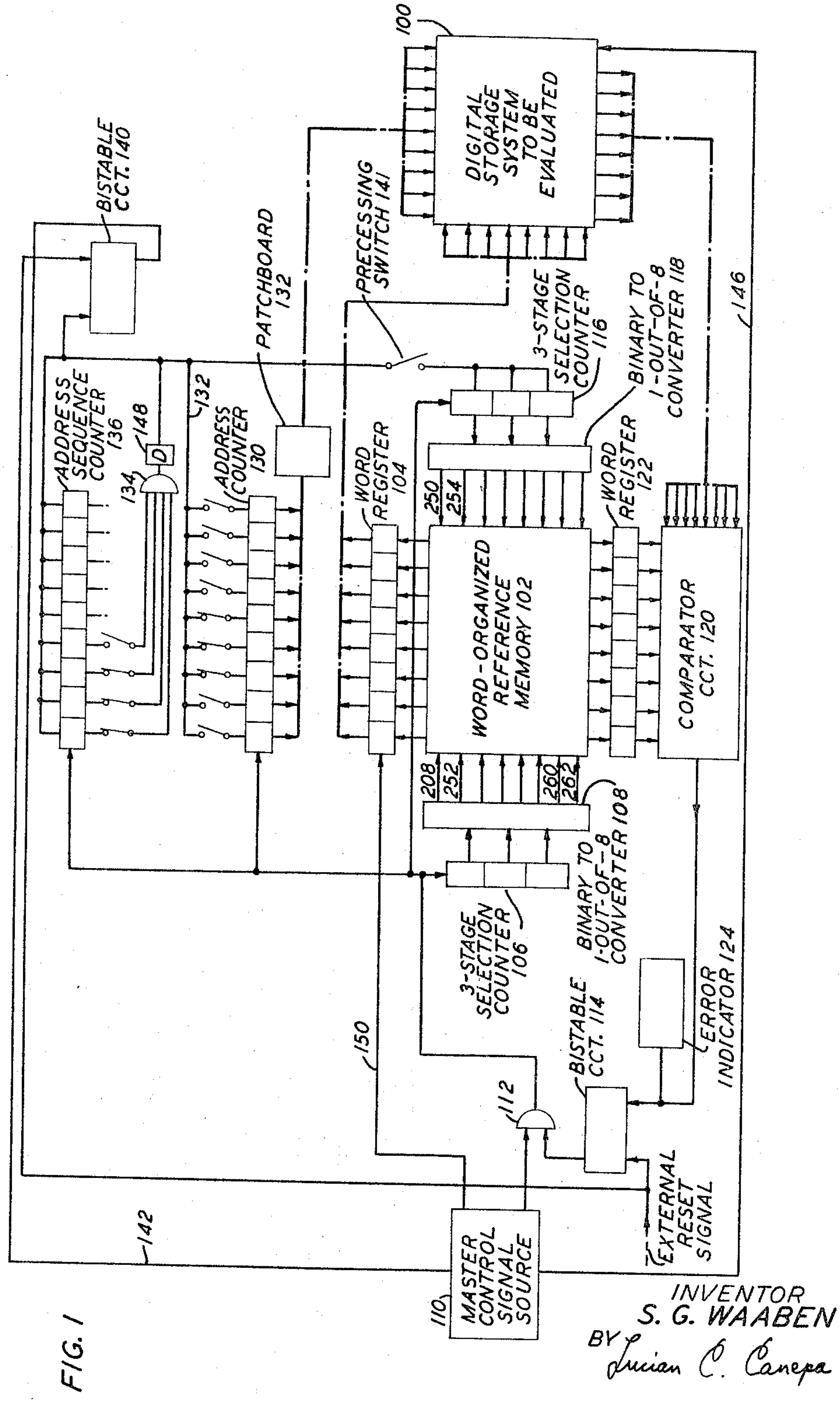
FIG. 1 depicts a specific illustrative apparatus made in accordance with the principles of the present invention.

The specific illustrative apparatus shown in FIG. 1 is designed to evaluate the dynamic operating characteristics of a digital storage system or store 100. The apparatus includes a word-organized reference memory 102 whose storage capacity is in general N words. Herein, however, for illustrative purposes, the capacity of the memory 102 is assumed to be eight words. Moreover, in the particular examples to be considered herein, it is further assumed that each of the eight words stored in the reference memory 102 contains eight bits.

The reference memory 102 supplied words to the system 100 via an eight-stage word register 104. The determination of which particular word in the memory 102 is to be applied to the register 104 is under the control of a first stepping switch that comprises a three-stage binary selection counter 106 and a binary to one-out-of-eight converter 108. In turn, the counter 106 is advanced in a step-by-step manner by control signals applied thereto from a master source 110 via a two-input AND circuit 112 whose other input is connected to the output of an error-controlled bistable circuit 114.

Control signals from the source 110 are also applied via the AND circuit 112 to the input of another three-stage binary selection counter 116. The counter 116 and an associated binary to one-out-of-eight converter 118 comprise a second stepping switch that controls the application of reference words from the memory 102 via a word register 122 to a comparator circuit 120 whose other inputs are signals representative of the binary digits of a word being read out of the storage system 100. If a read-out word from the system 100 and its corresponding reference word from the memory 102 are identical, the comparator circuit supplies a "0" signal which neither activates an error indicator 124 nor switches the circuit 114 from the state in which it supplies a "1" or enabling signal to the AND circuit 112. If, on the other hand, the comparator circuit provides a "1" signal, thereby to indicate a lack of correspondence between a read-out word and its corresponding reference word, the error indicator 124 is activated and the bistable circuit 114 is switched to disable the AND circuit 112, thereby to block the passage of further control signals to the counters 106 and 116 of the first and second stepping switches, respectively.

During each time interval in which a reference word from the memory 102 is applied via the register 104 to the system 100, an address word is simultaneously applied to the system 100 from an address counter 130 via a patch board 132. For purely illustrative reasons, the counter 130 is depicted in FIG. 1 as including nine binary stages, therefore being capable of generating $2^9$ or 512 distinct address designations in response to advance or control signals supplied from the master source 110 via the AND circuit 112. The initial indication of the counter 130 is determined by the setting of nine manually operable switches which are respectively connected to the inputs of the nine stages thereof. The counter 130 is set to this initial indication by applying a signal to lead 132 which is connected to the upper contacts of the nine switches.

The lead 132 is connected via a delay unit 148 to the output of an AND circuit 134 to whose inputs are supplied signals from selected ones of the nine stages of an address sequence counter 136. The setting of selected ones of nine manually operable switches respectively connected to the outputs of the nine stages of the counter 136 determine at what point in the sequential advance thereof the AND circuit 134 provides an output signal to set the address counter 130 back to its initial indication. Thus, for example, if as indicated in FIG. 1, the three left-most switches connected to the counter 136 are closed, the AND circuit 134 provides a "1" output signal when the three left-most stages of the counter 136 have been driven to the representations "1," "1," "1," respectively, by advance signals from the master source 110. The output of the AND circuit 134 also serves to reset the counter 136 to its clear or all-"0" condition and, in addition, as will be described in detail hereinbelow, serves to reset the selection counter 116 to its initial condition during the precessing mode of operation.

By means of the aforementioned patch board 132 shown in FIG. 1, the nine output leads from the address counter 130 may be selectively connected in any desired pattern to respective ones of the nine leads emanating from the right-hand side of the patch board 132. In this way the normal binary progression of words supplied by the counter 130 may be altered in 9! or 362,880 different ways before being applied to the storage system 100. Accordingly, an operator may select address locations in the system 100 which do not correspond to the sequential progression of binary numbers provided by the counter 130. For example, the patch board 132 may be arranged to convert the three successive nine-digit binary numbers 100000000, 010000000, and 110000000 to 000010000, 000000001 and 000010001. This conversion is accomplished by selectively patching or connecting the left-hand leads to the right-hand ones. In particular, the uppermost left-hand lead is patched to the middle one of the right-hand leads, and the next to the uppermost left-hand lead is patched to the bottommost right-hand lead.

By such selective alterations of the outputs of the counter 130 there is provided useful flexibility in the choice of the particular address locations to be exercised during evaluation of the system 100. In addition, by manually, mechanically or electronically operating the patch board 132 in a random way, evaluation of the storage system 100 can be made to take place in a manner which closely simulates a random operating condition of the system 100.

Before proceeding to a description of a typical cycle of operation of the specific apparatus shown in FIG. 1, the illustrative eight-word reference memory 102 shown in detail in FIG. 2 will be described. As indicated in FIG. 2, input signals are supplied to the memory 102 from the one-out-of-eight converters 108 and 118, and output signals are supplied in parallel by the memory 102 via two sets of eight output leads to the registers 104 and 122.

Figure 2:
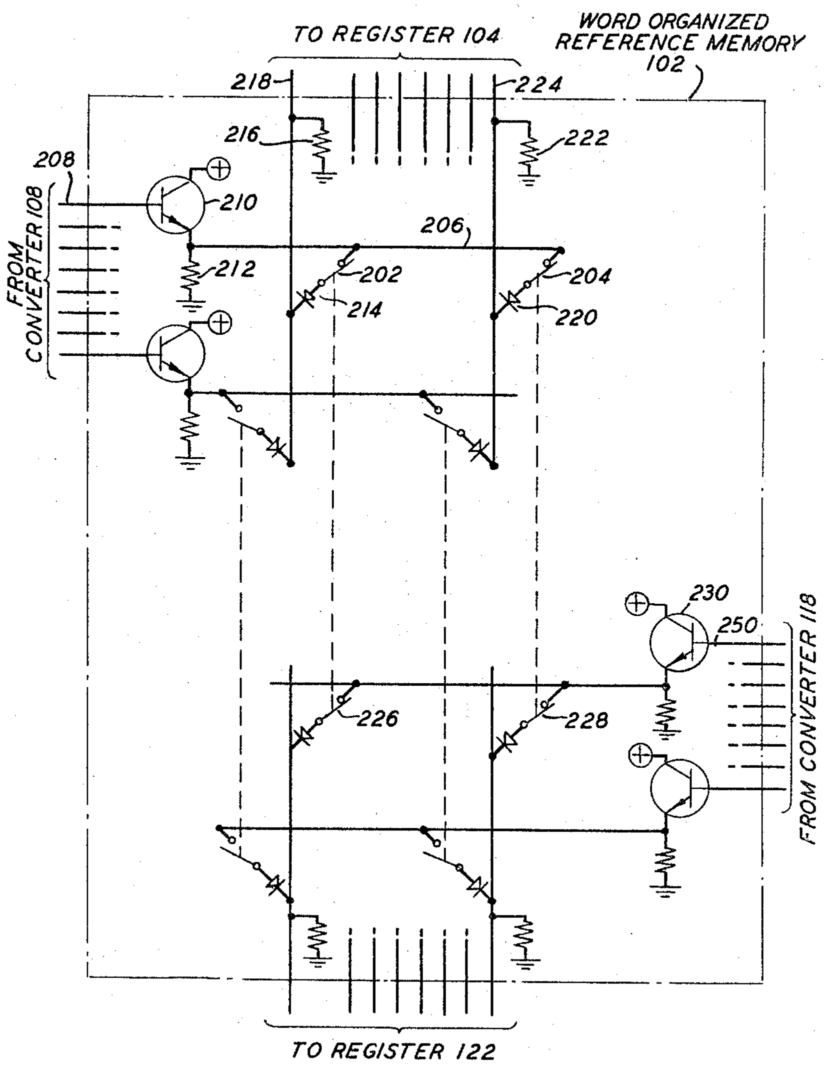
FIG. 2 shows in detail the form which the reference memory included in FIG. 1 may illustratively take.

Assume that a relatively high positive potential (which may, for example, be designated a "1" signal) is applied from the converter 108 to the uppermost one 208 of the eight leads shown in the upper left-hand corner of FIG. 2. Assume further that manually operable switches 202 and 204 are placed in their closed positions, as shown, and that the other six switches (not shown) connected between lead 206 and the middle six vertical leads extending to the register 104 are left in their open positions.

As a result of a "1" signal being applied to the lead 208 shown in FIG. 2, transistor 210 is switched from its normally nonconducting to its conducting state, whereby a positive output voltage appears across emitter resistor 212 thereof. This voltage causes a current to flow through the closed switch 202, through its associated diode 214, and through resistor 216 to ground, thereby to apply a positive or "set" signal via lead 218 to the left-most stage of the word register 104 to set that stage to its "1" state. The aforementioned voltage appearing across the emitter resistor 212 also causes a current to flow through the closed switch 204, through its associated diode 220, and through resistor 222 to ground, which applies a positive or "set" signal via lead 224 to the right-most stage of the register 104 to also set that stage to its "1" state.

The intermediate six stages of the register 104 are not set to their "1" states because the other six switches (not shown) connected to the horizontal lead 206 are assumed to have remained in their open circuit conditions. Hence, it has been shown that the application of a "1" signal from the converter 108 to the single input lead 208 causes the binary word 10000001 to be stored in the register 104.

In FIG. 2 dashed lines have been employed to indicate that each of the switches included in the upper matrix of switches which interconnect the converter 108 and the register 104 is mechanically ganged to a corresponding switch in a lower matrix interconnecting the converter 118 and the register 122. Thus, for example, the switches 202 and 204 are mechanically coupled to switches 226 and 228, respectively, to move in unison therewith. Therefore, closure of the two switches 202 and 204 places the switches 226 and 228 of the lower matrix in their closed circuit positions also, whereby application of a "1" signal from the converter 118 to the base of transistor 230 causes the word 10000001 to be applied to the word register 122.

Thus, closure of selected ones of the switches of the upper matrix shown in FIG. 2 determines the binary form of the eight-digit words applied to the register 104 for write-in to the storage system 100 of FIG. 1. Similarly, the condition of the switches in the lower matrix determines the makeup of the eight-digit words applied to the register 122 for transmittal to the comparator circuit 120. As specified above, the two matrices of switches are mechanically coupled together. Therefore, every switch setting established in the upper matrix also establishes a corresponding word in the lower matrix, whereby the memory 102 provides for comparison purposes an exact counterpart of every word written into the store under test.

In a first or normal mode of operation characteristic of the specific illustrative apparatus shown in FIG. 1, the length $a \cdot N$ of each address sequence is selected to be an exact multiple of the number N of words contained in the memory 102. As mentioned above, N is assumed herein for illustrative purposes to equal 8 and, in addition, the length of each address sequence as determined by the counter 136 will be assumed to be 16. Operation in this mode involves initially applying signals from the master control source 110 via conductors (not shown) to reset the counters 106, 116 and 136 and the registers 104 and 122 to their all-"0" states. At the same time the address counter 130 is reset by a signal from the source 110 to a binary indication which is lower by one count than the desired initial representation thereof. Following the initial setting of the aforementioned counters and registers, a bistable circuit 40 is set by a signal from the source 110 via lead 142, to supply a signal to the bistable circuit 114. The circuit 114 is thereby maintained, during the initial loading of the store 100, in a condition to enable the AND circuit 112 regardless of the nature of the output of the comparator circuit 120.

Figure 4:
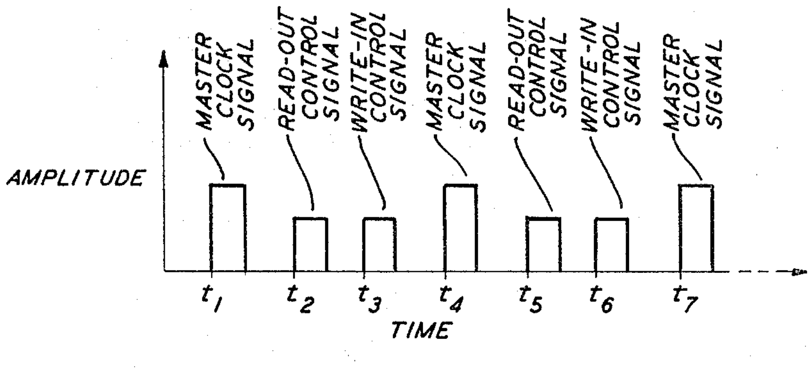
FIG. 4 illustrates the repetitive pattern of clock and control signals supplied by a master control source 110 included in FIG. 1.

To initiate an actual read-out, write-in cycle of operation in the illustrative apparatus shown in FIG. 1, the control source 110 applies at time $t_1$ a first master clock signal (see FIG. 4) via the enabled AND circuit 112 to advance each of the selection counters 106 and 116 to its initial binary representation 001 which is translated by the one-out-of-eight converter 108 to energize its uppermost lead 208 and by the converter 118 to energize its uppermost lead 250. At the same time, the address counter 130 is advanced to its desired initial indication A1 and the sequence counter 136 is advanced by one binary count. In this way a preset reference word contained in the memory 102 is applied via the register 122 to the comparator circuit 120 and the same reference word is applied to the register 104. Subsequently at time $t_2$ (FIG. 4) the storage system 100 responds to the application thereto of a read-out control signal from the source 110 via lead 146, to apply to the circuit 120 the word stored at the address corresponding to the initial indication A1 of the counter 130 or to A1 as selectively modified by the patch board 132. (Hereinafter the scrambling effect of the patch board 132 will not be specifically mentioned.) During the initial loading of the store 100, words read out therefrom will bear an arbitrary relationship with respect to the reference words established in the memory 102. Hence, the comparator circuit 120 will most likely indicate the existence of a difference between each set of read-out and reference words, thereby to provide an error signal to the indicator 124 and to the bistable circuit 114. Nevertheless the bistable circuit 114 remains held by the output of the circuit 140 in its reset state, thereby to continue to enable the AND circuit 112 during the entire loading operation.

Subsequent to the aforementioned read out of a word from the system 100, the reference word stored in the register 104 is gated at time $t_3$, under control of a write-in signal from the control source 110, into the system 100 to be stored at an address location determined by the output of the counter 130. Next, at time $t_4$ a second master clock signal from the source 110 is applied via the AND circuit 112 to advance each of the selection counters 106 and 116 to the binary representation 010 which is translated by the one-out-of-eight converter 108 to energize its second lead 252 and by the converter 118 to energize its second lead 254. At the same time the address counter 130 is advanced one count beyond its initial indication to an indication A2 and the sequence counter 136 is advanced by one more count. In this way the second reference word contained in the memory 102 is applied via the register 122 to the comparator circuit 120 and the same reference word is applied to the register 104. Then, at time $t_5$ the word stored in the system 100 at the location corresponding to the address indication A2 is read out therefrom in response to a read-out signal from the source 110. This read-out word is applied to the circuit 120 and compared there with the second reference word. Next, at time $t_6$, in response to a write-in signal from the source 110, the second reference word is gated from the register 104 into the system 100 to the location corresponding to the indication A2.

In this same repetitive fashion the eight reference words W1 through W8 contained in the memory 102 are transferred to the system 100 to the respective locations corresponding to the indications A1 through A8 of the address counter 130. Then the ninth master clock signal from the source 110 advances each of the selection counters 106 and 116 to its initial state (the representation 001) whereby the leads 208 and 250 emanating from the converters 108 and 118, respectively, are again activated. Thus the ninth master clock signal results in the reference word W1 being applied to the register 122 for transfer to the comparator circuit 120 and to the register 104 for transfer to the store 100. Subsequent to the occurrence of the ninth clock signal, a word is read out of the store 100 from the location corresponding to the binary indication A9 of the address counter 130. Then the word W1 stored in the register 104 is gated into the system 100 for storage at the location corresponding to the indication A9. In an exactly similar manner the reference words W2 through W8 are stored in a step-by-step manner in the system 100 at locations corresponding to the indications A10 through A16 generated by the address counter 130.

In the specific example considered herein, switches associated with the counter 136 were preset to establish an address sequence length of 16. Accordingly, the counter 136 responds to the application thereto of the sixteenth master clock signal from the source 110 by supplying energizing signals to all of the closed paths connecting the counter 136 and the AND circuit 134. In response thereto, the circuit 134 provides an output signal which is delayed by the delay unit 148 for a time sufficient to permit the illustrative apparatus to complete its read-out, write-in operation subsequent to the occurrence of the sixteenth master clock signal from the source 110.

The output signal provided by the delay unit 148 is applied to the address sequence counter 136 to reset it to its all-"0" state. This output signal is also applied to the address counter 130 to reset it to the indication which is one count below the desired initial representation thereof. In addition, the output signal from the unit 148 resets the bistable circuit 140 and thereby removes from the left-hand input terminal of the bistable circuit 114 the signal which had held the circuit 114 in its enabling state with respect to the AND circuit 112. Hence, any subsequent "1" or error-indicating signal from the comparator circuit 120 will act to set the bistable circuit 114, thereby to prevent the circuit 112 from passing any subsequent clock signals from the source 110 to the counters 106, 116, 130 and 136. It is noted that the bistable circuit 114 may be returned to its reset condition at any time by applying an appropriate signal thereto from an external reset signal source (not shown).

The aforedescribed illustrative cycle of operation results in the reference words W1 through W8 being loaded into the storage system 100 at address locations respectively corresponding to the indications A1 through A8 of the address counter 130. Then, as the selection counters 106 and 116 were recycled to their starting positions, the words W1 through W8 were again loaded into the system 100. However, this second time the reference words were directed to the address locations respectively corresponding to the indications A9 through A18 of the counter 130. At that point the loading cycle was terminated and the specific illustrative apparatus was ready to commence a normal read-out, write-in cycle of operation in which each comparison of a reference word with its corresponding word from the system 100 determines whether or not the AND circuit 112 remains enabled to pass additional clock signals to the novel apparatus described herein.

The words W1 through W8 contained in the reference memory 102 can be selectively modified in a number of ways before being applied to the store 100, thereby to increase in effect the number of different words available for exercising the store. For example, after loading the words W1 through W8 into address locations in the store 100 corresponding to the indications A1 through A8, the words W1 through W8 can be respectively complemented during their storage in the register 104 before being applied a second time to the store 100. This can be accomplished by applying suitable complementing signals to the register 104 from the master source 110 via lead 150. Other ways of selectively modifying words stored in the register 104 are possible, such as, for example, complementing selected digits of certain words. These and other related techniques are directed at increasing the number of different words that are available for application to the store 100.

In a second mode of operation characteristic of the illustrative system shown in FIG. 1, the length of each address sequence is selected not to be an exact multiple of the number of words contained in the reference memory 102. In this mode (known as the precessing mode) the first and second selection counters 106 and 116, and their respectively associated converters, operate in synchronism and in phase only during the loading cycle in which words are initially written into the store 100. Thereafter the selection counter 106 is recycled to its initial representation after each full stepping sequence which, in the specific example considered herein, means that the counter 106 is recycled to the representation 001 by the ninth input clock signal and every eighth clock signal thereafter. On the other hand, the selection counter 116 is thereafter reset to the indication 000 (which is one count before its initial representation 001) by the delayed signal derived from the output of the AND circuit 134. This signal is applied to the counter 116 via a precessing switch 141 which is in its closed circuit position during the precessing mode of operation.

The precessing mode of operation will be better understood by describing in detail a typical such cycle. The length of each address sequence as determined by the counter 136 will be assumed to be fifteen. Of course, fifteen is not an exact multiple of eight, which is the number of words assumed to be contained in the reference memory 102. Operation in the precessing mode is commenced in exactly the same manner as described above for the first or normal mode of operation. In particular, the initial resetting of the counters 106, 116 and 136, the registers 104 and 122, the address counter 130 and the setting of the bistable circuit 140, take place exactly as described hereinabove in response to control signals supplied by the master source 110. Next, loading of those locations in the system 100 which correspond to indications B1 through B15 generated by the address counter 130 also takes place in the same way described above in connection with the normal mode.

At a predetermined time after the occurrence of the fifteenth master clock signal supplied by the source 110, a signal is supplied by the delay unit 148 to the address sequence counter 136 to reset it to its all-"0" state, thereby to condition the counter 136 for another address sequence in the precessing mode. This signal is also applied to the address counter 130 to reset it to the indication which is one binary count below its initial representation B1. In addition, the output signal from the unit 148 resets the bistable circuit 140, thereby signaling the end of the loading phase by removing from the left-hand input terminal of the bistable circuit 114 the signal which had locked the circuit 114 in its enabling state with respect to the AND circuit 112. Furthermore, the signal from the delay unit 148 is applied via the closed precessing switch 141 to reset the election counter 116 to the representation 000 which is one binary count before its initial representation 001. Up to this point the counters 106 and 116 have been advanced together in synchronism and in phase by the first fifteen master clock signals from the source 110. More specifically, each of the counters is advanced from 001 through 000 by the first eight clock signals and then to the representation 111 by the subsequent seven clock signals. Therefore, at the time that the counter 116 is reset to 000, the counter 106 indicates 111, whereby the next-to-the-bottom lead 260 emanating from the right-hand side of the one-out-of-eight converter 108 is energized.

During the aforementioned loading phase the reference words W1 through W8 were written into the storage system 100 at address locations respectively corresponding to the indications B1 through B8 of the address counter 130, and then the words W1 through W7 were loaded into the system 100 at locations respectively corresponding to the indications B9 through B15.

Subsequent to the completion of the loading phase in the precessing mode of operation, the sixteenth master clock signal from the source 110 advances the selection counter 106 to the indication 000 and advances the counter 116 to its initial indication 001. These indications are translated by the one-out-of-eight converter 108 to energize its bottommost lead 262 and by the converter 118 to energize its uppermost lead 250. At the same time the address counter 130 is advanced to its initial indication B1 and the sequence counter 136 is advanced by one binary count. In this way the reference word W8 obtained in the memory 102 is applied to the register 104, while a different reference word, viz., the word W1, is applied via the register 122 to the comparator circuit 120. Subsequently the storage system 100 responds to the application thereto of a read-out control signal from the source 110 to apply to the circuit 120 the word stored at the address location corresponding to the initial indication B1 of the counter 130. This stored word should be an exact counterpart of the reference word W1, for it was the word W1 that was written into the location corresponding to B1 earlier in the precessing cycle of operation.

Subsequent to the aforementioned read-out from the system 100 of the word stored at the location corresponding to B1, the reference word W8 stored in the register 104 is gated, under control of a write-in signal from the control source 110, into the system 100 to be stored at the B1 location. In this way the word written into this particular location in the store 100 is changed from one address sequence to the next. In other words, during this mode of operation the reference words W1 through W8 are precessed through the particular address locations in the store 100 determined by the address counter 130. For example, in eight consecutive address sequences beginning with the one described above, the B1 location in the store 100 will have written therein in sequence the reference words W8, W1, W2, W3, W4, W5, W6 and W7. Each of the other selected address locations in the store 100 will also have different successive reference words written therein.

In the specific precessing example considered herein, the size of the precessing step was one. In other words, a particular address location in the system 100 had stored therein in successive address sequences successive ones of the reference words contained in the memory 102. As a result, the selection counters 106 and 116 were advanced out of synchronism by one count subsequent to the initial loading cycle. In other examples of the precessing mode of operation, however, the counters 106 and 116 are advanced out of synchronism by different counts. Thus, for example, if the number of words stored in the memory 102 is again assumed to be eight but the length of an address sequence is assumed to be fourteen, the counters 106 and 116 will then advance out of synchronism by two counts. In this example, the size of the precessing step is two and a particular address location in the system 100 would have applied thereto in successive address sequences the reference words designated W1, W7, W5, W3, W1 and so forth.

Figure 3:
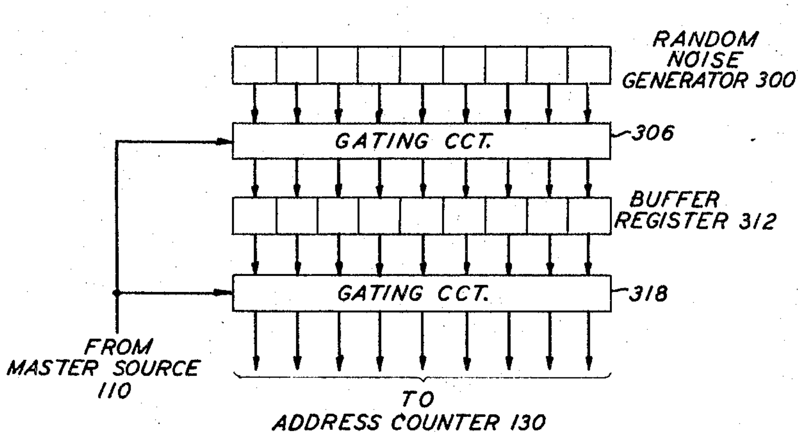
FIG. 3 illustrates an alternative arrangement suitable for setting the address counter shown in FIG. 1 to its initial indication.

Closer simulation of the random operating conditions of the storage system under test may be achieved by periodically changing the starting indication from which the address counter 130 progresses during each address sequence. Advantageously, the starting indication may be changed after a load compare cycle in a random way. One illustrative way of accomplishing this is shown in FIG. 3 wherein the output of a nine-stage random noise generator 300 is gated at selected instants of time into a buffer register 312 and thereafter through a gating circuit 318 to the address counter 130, to set it to a random starting indication. The nine leads shown at the bottom of the gating circuit 318 respectively extend to the inputs of the nine stages of the counter 130, it being understood that the switches associated with the counter 130 are in their open-circuit positions whenever the FIG. 3 arrangement is connected to the counter 130.

Specific illustrative circuit details for the counters 106, 116, 130 and 136, the registers 104 and 122, the converters 108 and 118, the bistable circuits 114 and 140, the master source 110, the comparator circuit 120, the AND circuits 112 and 134, the indicator 124 and the patch board 132, all shown in generalized form in FIG. 1, have not been provided because their implementations are believed, in view of the end requirements therefor set forth hereinabove, to be clearly within the skill of the art.

Moreover, it is emphasized that although a particular reference memory 102 is shown in FIG. 2 and described in detail herein, a wide variety of other reference memories, each capable of storing N $p$-bit words are suitable for inclusion in a specific illustrative apparatus made in accordance with the principles of the present invention. It is, of course, understood that the circuits directly assocated with the reference memory 102 may have to be changed in over-all form to correspond with each change of the memory 102. For example, if the memory 102 is designed to store sixteen eleven-bit words, each of the converters 108 and 118 would be modified to be of the one-out-of-sixteen type, each of the counters 106 and 116 would be modified to include four stages and each of the registers 104 and 122 would be modified to include eleven stages.

Furthermore, it is to be understood that the above-described arrangements are only illustrative of the application of the principles of the present invention. Numerous other arrangements may be devised by those skilled in the art without departing from the spirit and scope of this invention. For example, selective complementing of words stored in the register 104 may take place in the precessing mode as well as in the first or normal mode of operation. In addition, the illustrative apparatus described herein may, if desired, easily be adapted to repeatedly evaluate a single selected address location in the store being tested.

What is claimed is:

1. In combination, word-organized memory means for storing N reference words, where N is any positive integer greater than one, first and second word registers connected to said memory means, first stepping switch means connected to said memory means and responsive to each occurrence of a control signal for routing a reference word to said first register, and second stepping switch means connected to said memory means and responsive to each occurrence of said control signal for routing a reference word to said second register.

2. A combination as in claim 1 wherein each of said first and second stepping switch means includes a one-out-of-N converter having N output leads connected to said memory means and a selection counter connected to said converter for determining which one of the N output leads thereof is energized.

3. A combination as in claim 1 further including a circuit connected to said second register for comparing a reference word stored in said second register with a word read out of a storage system being evaluated.

4. A combination as in claim 3 still further including means for generating addresses determinative of the locations in said storage system to which reference words sequentially stored in said first register are to be respectively applied.

5. A combination as in claim 4 including means for setting said generating means to a predetermined initial indication.

6. A combination as in claim 4 including means for setting said generating means to a random initial indication.

7. A combination as in claim 5 further including means for determining the number of different designations to be provided by said generating means before said means is returned to said predetermined initial indication.

8. A combination as in claim 6 further including means for determining the number of different designations to be provided by said generating means before said generating means is returned to an initial indication.

9. A combination as in claim 4 wherein said generating means includes an address counter and a patch board connecting said counter to said storage system.

10. A combination as in claim 9 including means for establishing the setting at which said address determining means provides an output control signal.

11. A combination as in claim 10 further including circuitry responsive to said output control signal from said address determining means for resetting said address counter and said determining means.

12. A combination as in claim 11 wherein said circuitry includes means connected to the selection counter in said second stepping switch and responsive to said output control signal for resetting said counter.

13. In combination in an apparatus for evaluating a digital storage system, a reference memory, a first stepping switch connected to said memory for routing successive words from said memory to said system, a comparator circuit, a second stepping switch for routing words from said memory to said comparator circuit for comparison with words read out of said system, means for determining the number of locations in said system which are evaluated during an address sequence, and means responsive to the completion of an address sequence as determined by said first-mentioned means for resetting said second stepping switch.

14. Apparatus for evaluating a digital storage system comprising word-organized memory means for storing reference words, address-generating means connected to said system, means for setting said address-generating means to an initial indication, stepping switch means connected to said memory for routing said reference words in sequence to said system into locations determined by said address-generating means, means for determining the length of an address sequence, and means responsive to the completion of an address sequence as indicated by said determining means for resetting said address-generating means and said determining means.

15. Apparatus as in claim 14 further including means connected to said memory means and responsive to said resetting means for routing said reference words out of said memory means for comparison with corresponding words read out of said system.

16. Apparatus for exercising a digital storage system by applying to the system a first control signal to cause an information word stored in a particular address location of the system to be read out therefrom and by then applying to the system a second control signal to cause a reference information word to be written into said particular address, said apparatus comprising a word-organized memory for storing reference words, first and second word registers each connected to said memory, a first stepping switch connected to said memory and responsive to each occurrence of a master clock signal for routing a reference word to said first register, each master clock signal being followed by one of said first and then one of said second control signals, a second stepping switch connected to said memory and also responsive to each occurrence of a master clock signal for routing a reference word to said second register, a comparator circuit connected to said second register, means connecting said comparator circuit to said system and responsive to each occurrence of a first control signal for applying a word read out of said system to said circuit for comparison there with the word stored in said second register, circuitry connected to said storage system for generating successive address indications constituting an address sequence, means connecting said first register to said system and responsive to each occurrence of a second control signal for applying the word contained in said first register to said storage system to a location determined by said circuitry, means for controlling the number of indications to be included in each address sequence generated by said circuitry, and means responsive to said controlling means reaching a predetermined indication for applying reset signals to said circuitry, to said controlling means and to said second stepping switch.

17. In combination, reference memory means for storing N reference words, where N is any positive integer greater than one, means connected to said storing means for applying a selected one of said stored reference words to a comparator circuit, means connected to said storing means for applying a different selected one of said stored reference words to a predetermined storage location of a storage system which is to be evaluated, an exact counterpart of said selected word having previously been stored in said system at said predetermined storage location, and means for reading out a stored word from said predetermined location and applying it to said comparator circuit and for subsequently controlling said second-mentioned applying means to apply said different selected word to said predetermined location of said system.

References Cited by the Examiner

UNITED STATES PATENTS 3,222,645 12/1965 Davis ------------ 340—146.2

OTHER REFERENCES

Pages 376, 377, 454, 1962, Digital Computer Fundamentals, Y. Chu, McGraw-Hill.

ROBERT C. BAILEY, *Primary Examiner.*

M. LISS, O. E. TODD, *Assistant Examiners.*